US012633446B2

(12) United States Patent
Schroeder et al.

(10) Patent No.: US 12,633,446 B2
(45) Date of Patent: May 19, 2026

(54) WINDING POST FOR CONNECTING TO A COIL BODY OF AN ELECTROMAGNETIC COIL

(71) Applicant: BERKENHOFF GMBH, Heuchelheim (DE)

(72) Inventors: Waldemar Schroeder, Giessen (DE); Ivo Zunke, Giessen (DE)

(73) Assignee: BERKENHOFF GMBH, Heuchelheim (DE)

(*) Notice: Subject to any disclaimer, the term of this patent is extended or adjusted under 35 U.S.C. 154(b) by 742 days.

(21) Appl. No.: 18/021,594

(22) PCT Filed: Aug. 4, 2021

(86) PCT No.: PCT/EP2021/071791
§ 371 (c)(1),
(2) Date: Feb. 16, 2023

(87) PCT Pub. No.: WO2022/037946
PCT Pub. Date: Feb. 24, 2022

(65) Prior Publication Data

US 2023/0307172 A1 Sep. 28, 2023

(30) Foreign Application Priority Data

Aug. 21, 2020 (DE) ..................... 10 2020 121 948.2

(51) Int. Cl.
*H01F 27/28* (2006.01)

(52) U.S. Cl.
CPC ................................ *H01F 27/2828* (2013.01)

(58) Field of Classification Search
CPC .................................................. H01F 27/2828
See application file for complete search history.

(56) References Cited

U.S. PATENT DOCUMENTS 5,497,936 A * 3/1996 Vojta .................... B23K 1/0008 228/259
2010/0229381 A1* 9/2010 Freakes .................... H01R 4/24 29/825
2022/0256661 A1* 8/2022 Fursa ........................ H01F 5/02

FOREIGN PATENT DOCUMENTS

DE 1949413 A1 * 4/1971
DE 1949413 B2 1/1976

(Continued)

OTHER PUBLICATIONS

Decision to grant a European patent, EU Patent Office Sep. 18, 2025 (Year: 2025).*

*Primary Examiner* — Malcolm Barnes
(74) *Attorney, Agent, or Firm* — Dickinson Wright PLLC; Andrew D. Dorisio

(57) ABSTRACT

A wrapping post (10) for connection to a coil body of an electromagnetic coil, the wrapping post (10) having a rod-shaped post body (11) formed from a wire part and has a polygonal cross section or circular cross section, and the post body (11) being provided with a row arrangement (15) of surface elements on its surface (13, 14) in the longitudinal direction (16), the surface elements extending transversely to the longitudinal direction (16) and being at least partly formed as recesses (17), the recesses (17) only extending over a partial circumference of the post body (11) in the circumferential direction, the recesses (17) extending in the circumferential direction between adjacent longitudinal edges (18, 19) of the polygonal cross section in such a manner that the recesses (17) are spaced apart from the longitudinal edges (18, 19) or extend over a partial circumference of the circular cross section.

9 Claims, 2 Drawing Sheets

(56) References Cited

FOREIGN PATENT DOCUMENTS

| | | | | | |
|---|---|---|---|---|---|
| DE | 202017104818 | U1 | | 12/2017 | |
| EP | 0878809 | A2 | * | 11/1998 | ............... H01F 5/04 |
| JP | H08255708 | A | * | 10/1996 | |

* cited by examiner

WINDING POST FOR CONNECTING TO A COIL BODY OF AN ELECTROMAGNETIC COIL

TECHNICAL FIELD

The present invention relates to a wrapping post for connection to a coil body of an electromagnetic coil, the wrapping post having a rod-shaped post body which is formed from a wire part and has a polygonal or circular cross section, and the post body being provided with a row arrangement of surface elements on its surface in the longitudinal direction, the surface elements extending transversely to the longitudinal direction and being at least partly formed as recesses, the recesses only extending over a partial circumference of the post body in the circumferential direction.

BACKGROUND

Wrapping posts of the kind mentioned above serve to form connectors on electromagnetic coils, in such a manner that the connectors establish an electroconductive connection between the coil wire of the electromagnetic coil and a contact surface of a circuit board or the like. For connecting the coil wire to the wrapping post, a wrapping portion of the wrapping post anchored in the coil body via an anchoring portion is wrapped with an end of the coil wire disposed on the coil body, a solder material connection between the coil wire and the wrapping post generally being produced additionally for securing this connection.

To improve the anchoring of the anchoring portion in the plastic material of the coil body and the fastening of the coil wire end to the wrapping portion of the wrapping post, the surfaces of known wrapping post are provided with a structuring consisting of a row arrangement of recesses extending transversely to the longitudinal direction.

From DE 20 2017 104 818 U1, a wrapping post is known which is rod-shaped and provided with grooves extending transversely to the longitudinal direction of the wrapping post on two opposite surfaces, both in an anchoring portion and in a wrapping portion, the grooves extending over the entire width of the rod-shaped post body to the opposite longitudinal edges.

Experiments have shown that grooves penetrating the longitudinal edges allow for both favorably high tensile forces, which allow the wrapping post to detach from the anchoring to the coil body only if considerable force is used and thus ensure a reliable connection of the wrapping post to the coil body, and a good mechanical fastening of the coil wire end to the rod-shaped post body; however, the grooves penetrating the longitudinal edges of the polygonal cross section induce a notch effect at the longitudinal edges, such that the wrapping post can break when the wrapping post is bent, as it is sometimes necessary for connecting the wrapping post to conducting paths of a circuit board or to the coil body, or a wire can break in connection with the wire tension during the wrapping of the wire end.

SUMMARY

Therefore, the object of the present invention is to propose a wrapping post which has a higher component safety and reduces the risk of a wire break in comparison to the known wrapping post.

According to the invention, the recesses extend in the circumferential direction between adjacent longitudinal edges of the polygonal cross section in such a manner that the recesses are spaced apart from the longitudinal edges or extend over a partial circumference of the circular cross section.

With the wrapping post according to the invention, the dimension of the recesses is limited to the space between the opposite longitudinal edges of the polygonal cross section, without the recesses extending to the longitudinal edges of the polygonal cross section. Thus, the longitudinal edges themselves, at which a maximum compression stress in the polygonal cross section and a maximum wire tension occur as a result of the redirecting of the coil wire in a wrapping process, are excluded from the notch effect induced by the recesses. This significantly reduces the risk of component failure in a wrapping process or when the wrapping post is bent. Simultaneously, the intended anchoring effect of the recesses in the anchoring portion of the wrapping post is impaired as little as possible in that as long as the recesses do not penetrate the longitudinal edges, the width of the surface between the longitudinal edges can be used as much as possible for forming the recesses.

Depending on the respective contacting situation, the length of the rod-shaped post body can be linear or curved or bent once or several times.

According to the invention, the term "polygonal cross section" means that the surface of the post body is formed from several partial surfaces, which can have a flat or at least partly concave or convex surface, transitioning into each other at longitudinal edges, the longitudinal edges having a radius in practice. In contrast, the "circular cross section" has a circular circumference or a circumference approximately corresponding to the shape of a circle.

In addition to the recesses, the surface elements can also have elevations formed in sections.

If the recesses have a continuously decreasing depth towards their longitudinal ends according to a preferred embodiment of the wrapping post, a possibly induced notch effect caused by the longitudinal ends of the recesses can be reduced to a minimum, such that the advantageous effect, which increases the component safety, of the wrapping post according to the invention can be increased even further.

The advantageous effect can be increased further if the recesses have concave flanks which are inclined upward from a recess bottom to the surface.

Preferably, in a transition to the surface, the flanks are convex, such that, different from a sharp-edged transition to the surface, possible stress peaks in the surface can be prevented.

In a particularly preferred embodiment of the wrapping post, the recesses in the surface are frame-shaped, in particular annular, in such a manner that the recesses surround a central area formed by the surface of the post body, such that the anchoring effect can be increased even further compared to the conventional grooves extending transversely to the longitudinal direction of the post body.

Preferably, the recesses are disposed in opposite surfaces of the post body, such that in particular with small and the smallest diameters of the wire part used for forming the wrapping post, a possibly relatively shallow depth of the recesses can be compensated by disposing the recesses on multiple sides or on all sides. If required, not only selected opposite surfaces, but maximally all surfaces can be provided with recesses.

If the post body is designed so as to be electroconductive, in particular an electroconductive coating is not required for the post body.

Alternatively, it is also possible to form the post body without using an electroconductive material and to provide the post body with an electroconductive coating instead.

The wire designed according to the invention for forming a wrapping post formed as wire parts has the features of claim 9.

BRIEF DESCRIPTION OF THE DRAWINGS

Hereinafter, preferred embodiments of the wrapping post will be described in more detail with reference to the drawings.

DETAILED DESCRIPTION

Figure 1:
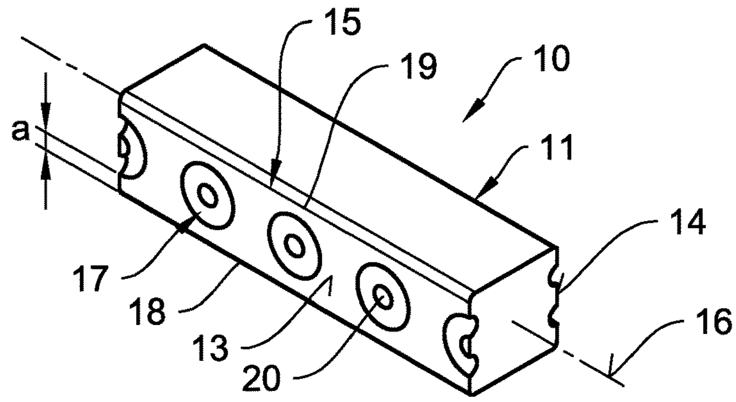
FIG. 1 is an isometric view of a wrapping post according to a first embodiment.
Figure 3:
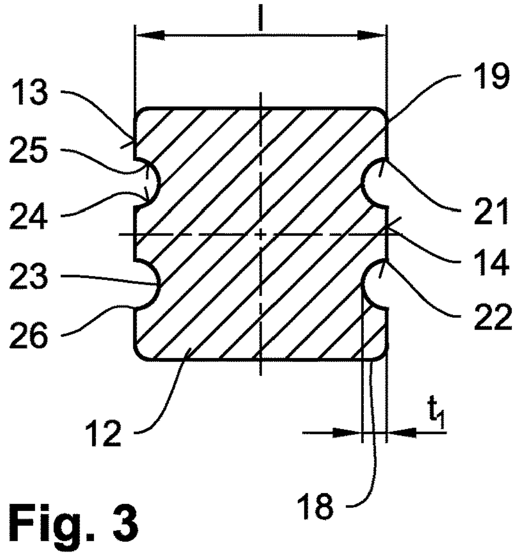
FIG. 3 is a cross-sectional view of the wrapping post shown in FIG. 2 according to a cutting line III-III in FIG. 2.

FIG. 1 shows a wrapping post 10 which has a rod-shaped post body 11, in this case extending in a straight line, having a polygonal cross section 12, in particular shown in FIG. 3.

FIG. 1 shows that two opposite surfaces 13, 14 of post body 11 are each provided with a row arrangement 15 of recesses 17. Recesses 17 extend transversely to longitudinal direction 16 at a distance a from opposite longitudinal edges 18, 19 limiting surfaces 13, 14 and are annular in the case at hand, in such a manner that recesses 17 surround a central area 20 formed by surface 13.

FIG. 3 shows that recesses 17 have a continuously decreasing depth $t_1$ towards their edges 21, 22, and in particular to longitudinal edges 18, 19. Furthermore, recesses 17 have concave flanks 24, 25 which are inclined upward from a recess bottom 23 to edges 21, 22 of surface 13. Furthermore, the flanks are convex in a transition 26 to surface 13 or 14 in the illustrated embodiment.

Figure 2:
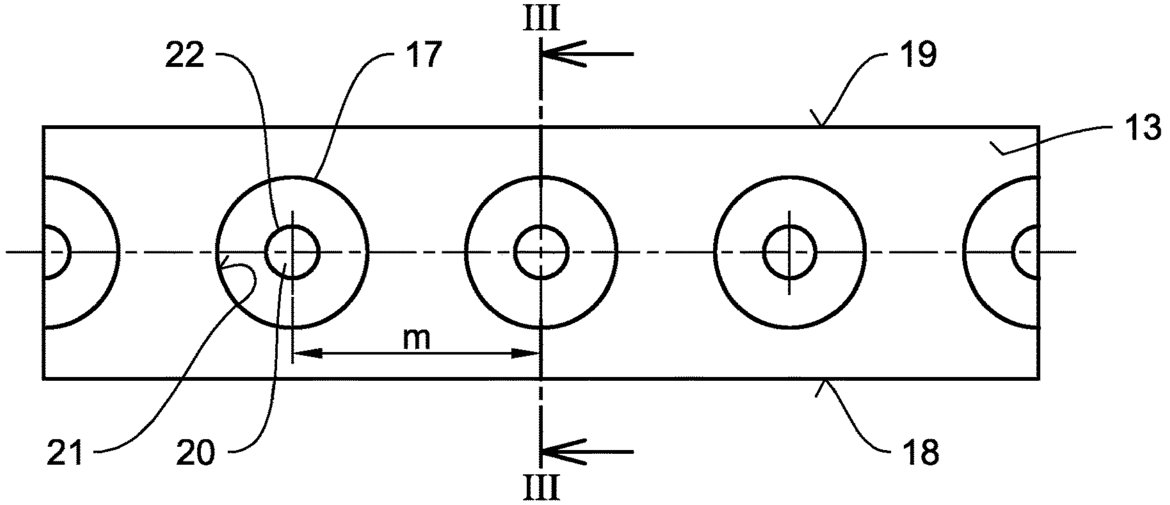
FIG. 2 is a side view of the wrapping post shown in FIG. 1.

In the embodiment of wrapping post 10 illustrated FIGS. 1-3, polygonal cross section 12, which is essentially square in this case, can have an edge length l of 0.5 mm. In longitudinal direction 16 of post body 11, recesses 17 on opposite surfaces 13, 14 have a center-to-center distance m which corresponds to edge length l in the present case. Preferably, depth $t_1$ of the recesses is chosen such that it is smaller than 0.05 mm, a depth of 0.03 to 0.04 mm having turned out to be particularly advantageous for achieving the favorably high tensile forces with the proportions of the embodiment illustrated at hand. With approximately 0.1 mm, edge distance a is chosen in the range of the diameter of central area 20.

Tests have shown that starting from the chosen proportions of the polygonal cross section, the aforementioned size indications can deviate up to 20% without impairing the intended advantageous effects.

Figure 4:
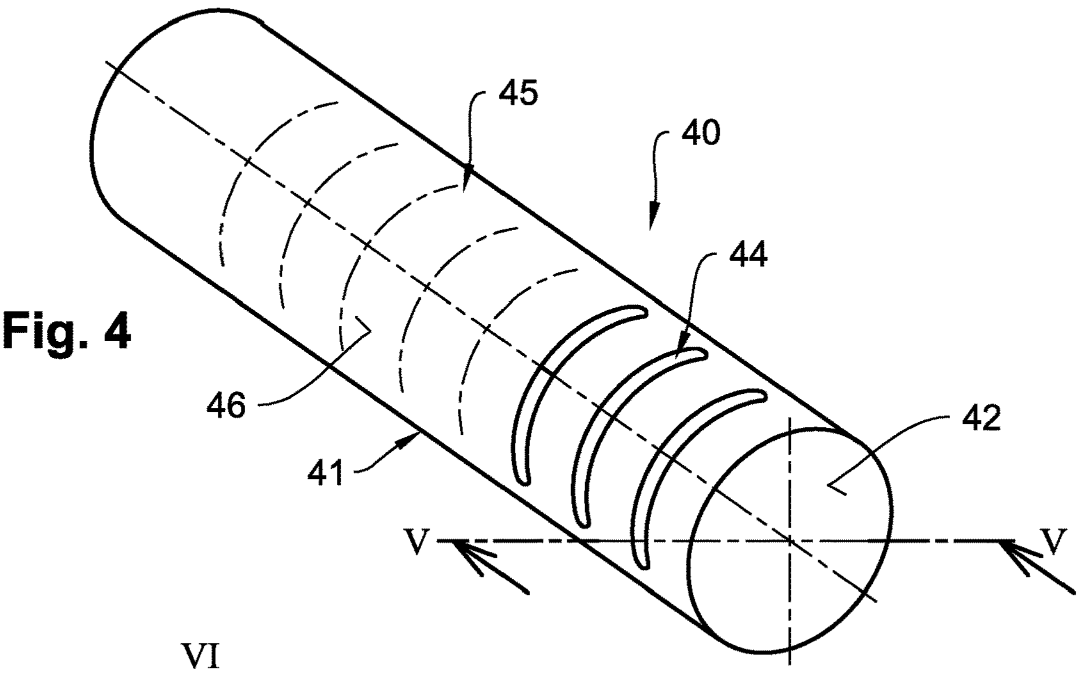
FIG. 4 is an isometric view of another embodiment of a wrapping post.
Figure 5:
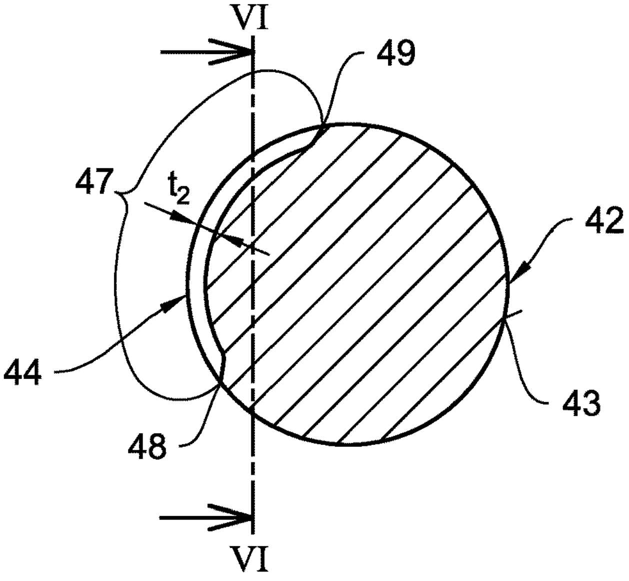
FIG. 5 is a cross-sectional view of the wrapping post shown in FIG. 4 according to a cutting line V-V in FIG. 4.

FIGS. 4 and 5 show another embodiment of a wrapping post 40, which has a rod-shaped post body 41 having a circular cross section 42, which has a circular circumference 43 in the present case; recesses 44, which are disposed in a row arrangement 45 on a surface 46 of post body 41, only extending over a partial circumference 47 of circular cross section 42.

In the embodiment shown, recesses 44 have a continuously decreasing depth $t_2$ towards their longitudinal ends 48, 49.

Figure 6:
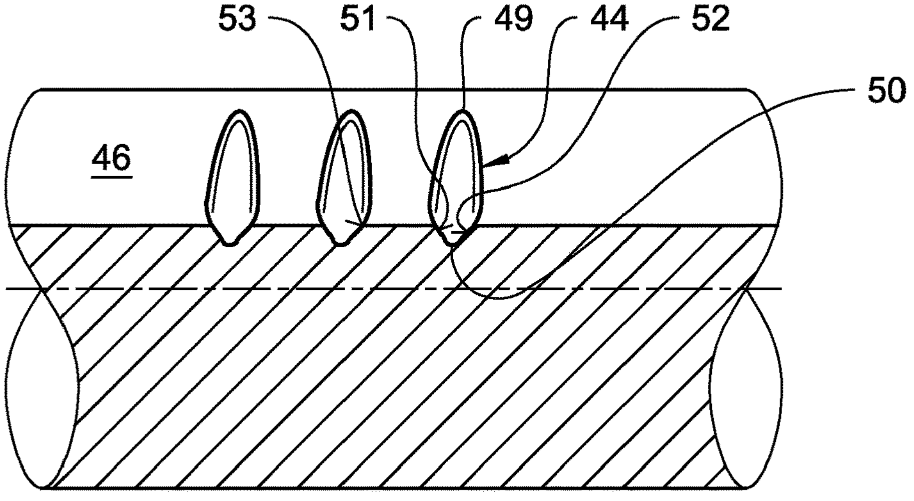
FIG. 6 is a partial sectional view of the wrapping post shown in FIG. 4 according to a cutting line VI-VI in FIG. 5.

In particular FIG. 6 shows that recesses 44 have concave flanks 51, 52 increasing from a recess bottom 50 to surface 46. Furthermore, flanks 51, 52 are convex in a transition 53 to surface 46.

In the case at hand, post body 41 of wrapping post 40 has proportions comparable in size to post body 11 of wrapping post 10.

In particular, post body 41 can also be provided with recesses 17 shown on post body 11 of wrapping post 10, the recesses being able to extend in different partial circumferences irrespective of the respective embodiment of the recesses as long as the recesses disposed in different partial circumferences are not formed so as to transition into each other continuously.

The invention claimed is:

1. A wrapping post (10, 40) for connection to a coil body of an electromagnetic coil, the wrapping post (10, 40) having a rod-shaped post body (11, 41) which is formed from a wire part and has a polygonal cross section (12) or circular cross section (42), and the post body (11, 41) being provided with a row arrangement (15, 45) of surface elements on its surface (13, 14, 46) in the longitudinal direction (16), the surface elements extending transversely to the longitudinal direction (16) and being at least partly formed as recesses (17, 44), the recesses (17, 44) only extending over a partial circumference (47) of the post body (11, 41) in the circumferential direction, wherein the recesses (17, 44) extend in the circumferential direction between adjacent longitudinal edges (18, 19) of the polygonal cross section (12) in such a manner that the recesses (17) are spaced apart from the longitudinal edges (18, 19) or extend over a partial circumference (47) of the circular cross section (42).

2. The wrapping post according to claim 1, wherein towards the longitudinal edges (18, 19), the recesses (17) have a continuously decreasing depth $t_1$.

3. The wrapping post according to claim 1, wherein the recesses (17, 44) have concave flanks (24, 25, 51, 52) increasing from a recess bottom (23, 50) to the surface (13, 14, 46).

4. The wrapping post according to claim 3, wherein in a transition (26, 53) to the surface (13, 14, 46), the flanks (24, 25, 51, 52) are convex.

5. The wrapping post according to claim 1, wherein the recesses (17) in the surface (13, 14) are frame-shaped and annular in such a manner that the recesses (17) surround a central area (20) formed by the surface (13, 14) of the post body (11).

6. The wrapping post according to claim 1, wherein the recesses (17) are disposed in opposite surfaces (13, 14) of the post body (11).

7. The wrapping post according to claim 1, wherein the post body (11, 41) is electroconductive.

8. The wrapping post according to claim 1, wherein the post body (11, 41) is provided with an electroconductive coating.

9. A wire for forming wrapping posts (10, 40) formed as wire parts according to claim 1.

* * * * *